United States Patent
Ohsaki

(10) Patent No.: US 6,790,426 B1
(45) Date of Patent: Sep. 14, 2004

(54) CARBONACEOUS NANOTUBE, NANOTUBE AGGREGATE, METHOD FOR MANUFACTURING A CARBONACEOUS NANOTUBE

(75) Inventor: Takashi Ohsaki, Shizuoka (JP)

(73) Assignee: Nikkiso Co., Ltd., Tokyo (JP)

(*) Notice: Subject to any disclaimer, the term of this patent is extended or adjusted under 35 U.S.C. 154(b) by 0 days.

(21) Appl. No.: 09/615,104

(22) Filed: Jul. 13, 2000

(30) Foreign Application Priority Data

Jul. 13, 1999 (JP) .......................................... 11-198731

(51) Int. Cl.[7] .................................................. D01F 9/12
(52) U.S. Cl. .................................................. 423/447.2
(58) Field of Search ........................ 428/408; 423/447.2

(56) References Cited

U.S. PATENT DOCUMENTS 5,489,477 A * 2/1996 Ohta et al. .................. 428/408
5,916,642 A * 6/1999 Chang ......................... 427/580
5,965,267 A * 10/1999 Nolan et al. ................. 428/408

OTHER PUBLICATIONS

Endo et al., 'The Production and Structure of Pyrolytic Carbon Nanotubes (PCNTs)' in *J. Phys. Chem. Solids* vol. 54 No. 12 pps. 1841–1848 (1993).*

José–Yacamáan et al., 'Catalytic Growth of Carbon Microtubules with Fullerene Structure' in *Applied Physics Letters* vol. 62 No. 6 pp. 651–659 Feb. 1993.*

Iijima, S., "Helical Microtubules of Graphitic Carbon," *Nature* vol. 354, pp. 56–58 (Nov. 7, 1991).

* cited by examiner

*Primary Examiner*—Stuart Hendrickson
(74) *Attorney, Agent, or Firm*—Darby & Darby

(57) ABSTRACT

A carbonaceous nanotube has a hollow part with an inner diameter of, at most, 5 nm, and a thickness part of, at most, 10 nm. The thickness part is formed of carbon atoms and hydrogen atoms, optionally containing at least one transition metal atom. Such a carbonaceous nanotube has excellent conductivity and excellent wettability.

7 Claims, 1 Drawing Sheet

CARBONACEOUS NANOTUBE, NANOTUBE AGGREGATE, METHOD FOR MANUFACTURING A CARBONACEOUS NANOTUBE

BACKGROUND TO THE INVENTION

The present invention relates to a carbonaceous nanotube, nanotube aggregate, and a method for manufacturing a carbonaceous nanotube. Described in further detail, the present invention relates to a carbonaceous nanotube, nanotube aggregate, and manufacture method for a carbonaceous nanotube, having excellent conductivity and excellent wettability.

A conventional method, known as the fluidized vapor method, is recognized for the manufacture of vapor grown carbon fiber. In this method, at least one type selected from the group consisting of organic metal compounds and inorganic metal compounds, and an organic compound, and a carrier gas are transported to a reaction region heated to around 1000° C.

In the fluidized vapor method, very small metal particles are generated in the vapor phase. The organic compounds on the metal particles suspended in the vapor phase decompose, allowing carbon to be deposited on these metal particles. By the growth in one direction of the deposited carbon, a vapor grown carbon fiber is obtained.

According to the conventional fluidized vapor method, a vapor grown carbon fiber having a constant aspect ratio with an outer perimeter diameter of 0.05 $\mu$m~10 $\mu$m and a length of 0.2 $\mu$m~2000 $\mu$m is easily manufactured industrially (M. Hatano, T. Ohsaki, K. Arakawa; 30th National SAMPE Symposium preprint 1467 (1985), Japanese Examined Patent Publication Number 62-49363).

According to the fluidized vapor method, a highly crystalline carbonaceous fiber with a diameter of 0.05~2 $\mu$m (Japanese Examined Patent Publication Number 3-61768), highly crystalline carbonaceous fiber with a diameter of 0.01~0.5 $\mu$m (Japanese Examined Patent Publication Number 5-36521), a vapor grown carbon fiber with a diameter of 3.5~70 nm (Japanese Examined Patent Publication Number 3-64606, Japanese Examined Patent Publication Number 3-77288), and the like, can be manufactured.

Another conventional method for the manufacture of graphite nanotubes is through arc discharge between graphite electrodes.

According to this conventional method, a plurality of graphite layers are layered from the inner perimeter surface to the outer perimeter surface. Its outer perimeter diameter is 10 nm or less, and its inner perimeter diameter is a few nanometers. A graphite nanotube which does not contain hydrogen atoms is obtained.

However, with the arc discharge method, there are several problems. For example, (a) the manufacturing method is complex because the reaction must be conducted under a vacuum or reduced pressure, and it is difficult to supply the graphite which is consumed by the arc discharge between the electrodes; (b) because the manufactured graphite nanotube is formed with graphite that does not contain hydrogen and because the manufactured graphite nanotube has few fullerene structure active sites, the chemical reactivity of the graphite nanotube is poor, (c) with the composite material obtained by combining the graphite nanotube and a resin, the mechanical strength of the composite material can not be improved because of poor wettability of the graphite nanotube with respect to the resin.

With the above highly crystalline carbon fiber (Japanese Examined Patent Publication Number 5-36521), there are also problems. The chemical reactivity is poor because the highly crystalline carbon fiber is a graphite with high crystallinity. A composite material obtained by combining the highly crystalline carbon fiber and a resin has poor wettability due to the highly crystalline nature carbon fiber. This results in a composite with poor mechanical strength which cannot be improved.

With the carbon fibers of the above highly crystalline carbon fiber (Japanese Examined Patent Publication Number 5-36521) and vapor grown carbon fibers with diameters of 3.5~70 nm (Japanese Examined Patent Publication Number 3-64606, Japanese Examined Patent Publication Number 3-77288), and the like, they are made into a more complete graphite crystal through heat treatment of the carbon fiber to make a graphitized carbon fiber. A further chemical stabilization of its surface is also performed.

With the above graphitized carbon fibers, because the graphite structure is well developed, the conductivity is very high. At the same time, because the fiber surface is chemically stable, the chemical reactivity is poor. For example, when a conductive coating material, obtained by mixing this carbon fiber and an adhesive, is coated on a coating target, there are problems of peeling of the coating film, and the like, because the affinity of the carbon fiber and the adhesive is low, or because the affinity of the carbon fiber and the coating target is low.

OBJECT AND SUMMARY OF THE INVENTION

It is an object of the present invention is to provide a carbonaceous nanotube, nanotube aggregate, and a method for manufacturing a carbonaceous nanotube which solves the foregoing problems.

It is a further object object of the present invention to provide a carbonaceous nanotube, nanotube aggregate, and manufacture method for carbonaceous nanotube which has excellent conductivity and excellent wettability.

Briefly stated, the present invention provides a carbonaceous nanotube having a hollow part with an inner diameter of, at most, 5 nm, and a thickness part of, at most, 10 nm. The thickness part is formed of carbon atoms and hydrogen atoms, optionally containing at least one transition metal atom. Such a carbonaceous nanotube has excellent conductivity and excellent wettability.

According to an embodiment of the present invention, there is provided a carbonaceous nanotube, comprising a hollow part having an inner diameter of, at most, 5 nm, a thickness part having a thickness of, at most, 10 nm, and the thickness part being a carbon material comprising hydrogen atoms and carbon atoms.

According to another embodiment of the present invention, there is provided a fiber aggregate, comprising carbonaceous nanotubes having a hollow part having an inner diameter of, at most, 5 nm, a thickness part, comprising carbon atoms and hydrogen atoms, having a thickness of, at most, 10 nm, the carbonaceous nanotubes being present at a ratio of at least 70 weight % with respect to the fiber aggregate, hydrogen atoms at a content ratio of 0.1~1 weight % with respect to the fiber aggregate, and carbon atoms at a content ratio of at least 98.5 weight % with respect to the fiber aggregate.

According to a further embodiment of the present invention, there is provided a method for manufacturing a carbonaceous nanotube, comprising mixing a transition metal compound, containing at least one transition metal atom, a sulfur compound, containing at least one sulfur atom, an organic compound containing a hydrocarbon, and a carrier gas, to obtain a raw material mixture, supplying the raw material mixture to a reaction region maintained at a temperature of about 900~1,300° C. inside a reaction tube, adjusting the raw material mixture supply so that the concentration of the transition metal atom in the raw material mixture is in the range from about 0.025~0.5 mol %, and the concentration of the hydrocarbon in the raw material mixture is in the range represented by $(273/(T-1000))^4 \sim 10((73/T-1000))$ mol %, wherein T represents the absolute temperature (K) of the reaction region.

A first feature of the present invention, for solving the above objects, is a carbonaceous nanotube, comprising a hollow part, having an inner diameter of, at most, 5 nm. A thickness part, the portion with the thickness from the outer perimeter surface to the inner perimeter surface, which is, at most, 10 nm, and preferably, at most, 5 nm. This thickness part is formed of carbon material, comprising hydrogen atoms and carbon atoms.

A second feature of the present invention, for solving the above objects, is a carbonaceous nanotube of the above feature, comprising, in addition, transition metal atoms.

A third feature of the present invention, for solving the above objects, is a fiber aggregate, comprising carbonaceous nanotubes, described in the above first feature, at a ratio of at least 70 weight % with respect to the whole. Hydrogen atoms are present at a content ratio of 0.1~1 weight % with respect to the whole. Carbon atoms are present at a content ratio of at least 98.5 weight % with respect to the whole. Transition metal atoms are present at a content ratio of 0.005~1 weight % with respect to the whole.

A fourth feature of the present invention, for solving the above objects, is a method for manufacturing a carbonaceous nanotube, wherein a raw material mixture is obtained by mixing a transition metal compound which contains transition metal atoms, a sulfur compound which contains sulfur atoms, an organic compound which contains a hydrocarbon, and a carrier gas. The raw material mixture is supplied to a reaction region which is maintained at a temperature of 900~1,300° C. inside a reaction tube. The raw material mixture is supplied so that the concentration of the transition metal atoms in the raw material mixture is in the range of 0.025~0.5 mol % and the concentration of the hydrocarbon in the raw material mixture is in the range represented by $(273/(T-1000))^4 \sim 10(273/(T-1000))$ mol %, wherein T represents the absolute temperature (K) of the reaction region.

The above, and other objects, features, and advantages of the present invention will become apparent from the following description read in conjunction with the accompanying drawings, in which like reference numerals designate the same elements.

DETAILED DESCRIPTION OF THE INVENTION

Carbonaceous Nanotube

Figure 1:
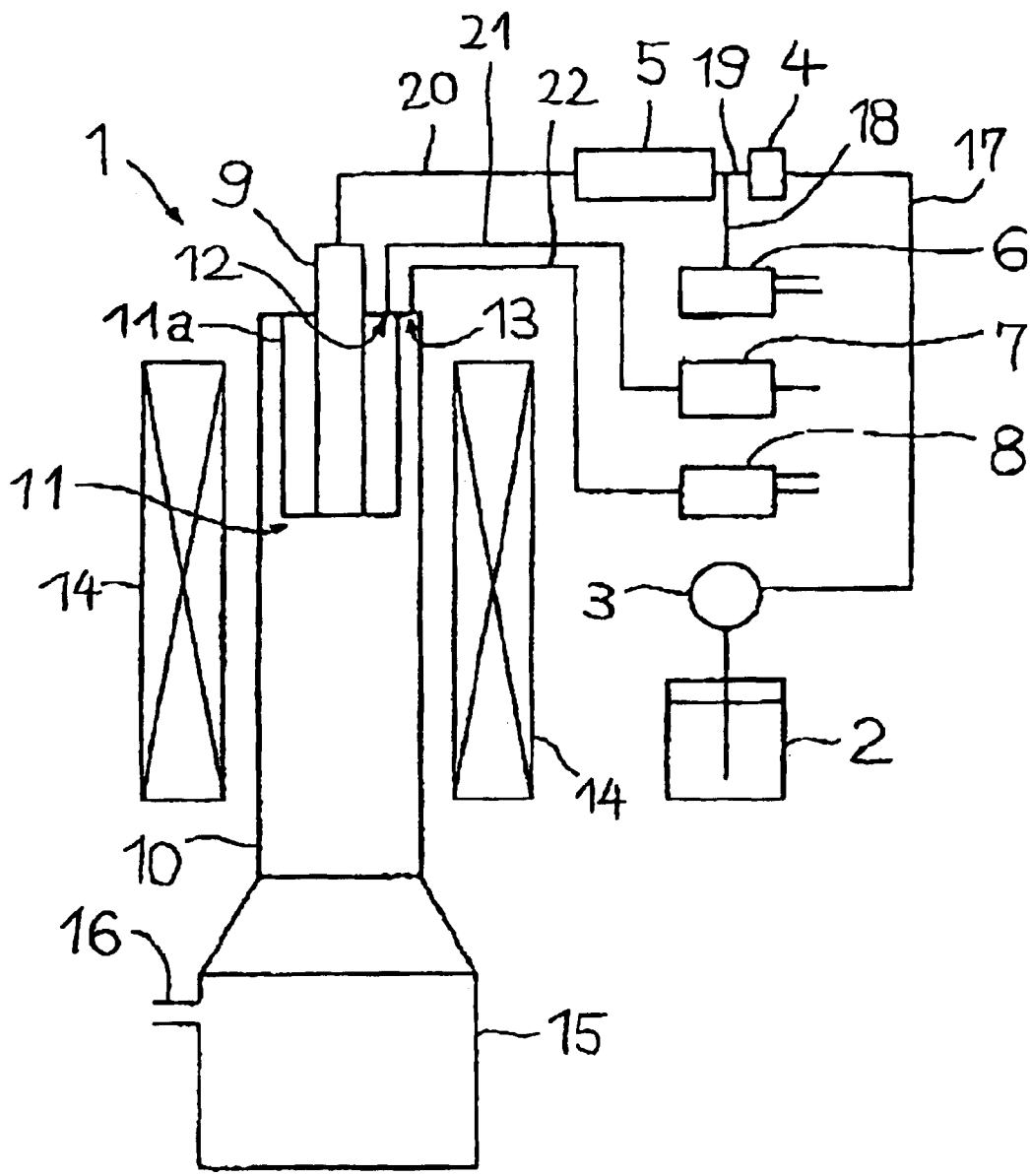
FIG. 1 is a schematic diagram of a vertical vapor grown carbon fiber manufacturing device used for the manufacturing method of a carbonaceous nanotube according to the present invention.

The carbonaceous nanotube of the present invention has a hollow part with an inner diameter of, at most, 5 nm, a thickness part of, at most, 10 nm, preferably a thickness part of, at most, 5 nm. The carbonaceous nanotube is formed from carbon material containing hydrogen atoms and carbon atoms.

The size of the inner diameter in the above hollow part and the thickness of the thickness part are determined, for example, by observing an arbitrary 100 samples by a transmission microscope and measuring the inner diameters and thicknesses. Therefore, the hollow part inner diameters and the thicknesses reported herein generally refer to an average values of a statistical sample.

The above carbonaceous nanotubes preferably have an average outer perimeter diameter of about 3~12 nm, and an inner perimeter diameter of about 2~5 nm.

When the thickness part is at the maximum of 10 nm, the average inner perimeter diameter is 2~5 nm, and the average outer perimeter diameter becomes 22 nm~25 nm. If the thickness is any thicker, the mechanical properties, electrical properties, and the like become inferior. Therefore, this thickness approximates an upper thickness limit.

When the carbonaceous nanotube of the present invention is observed by a transmission electron microscope, it is confirmed that the carbon material which forms the carbonaceous nanotube is an imperfect graphite layer, having a partially disordered layer construction.

Furthermore, by elemental analysis of the carbonaceous nanotube, it is confirmed that the carbon material that forms the carbonaceous nanotube contains hydrogen atoms and carbon atoms.

With the present invention, by having the carbon material which forms the carbonaceous nanotubes have a disordered layer construction and by having it contain hydrogen atoms, the disordered layer construction portions act as active sites, increasing the chemical reactivity of the carbon material. For example, with a composite material of this carbonaceous nanotube and a resin, the wettability of the carbonaceous nanotube is greatly increased.

With the present invention, the problem of the chemical stability arising from the carbon fiber of the prior art being of graphite material, or stated differently, the problems of the lack of activity of the carbon fiber of the prior art, are solved. Stated differently, because the carbonaceous nanotube of the present invention has hydrogen atoms, there is a disturbance in the hexagonal lattice surface construction of graphite. This disturbance in the hexagonal lattice surface construction generates a disordered layer construction part, generating chemical active sites. In addition, despite having a disordered layer construction, there is little decline in the mechanical construction.

The carbonaceous nanotube of the present invention can further contain a transition metal atom. In most cases, this transition metal atom is contained as particles in the tube ends. However, the transition metal atom can also be contained as atoms or clusters inside the carbon layer forming the tube. As with the hydrogen atoms contained in the carbon material, the transition metal atom has chemical activity. Furthermore, after the carbonaceous tube is formed, if the tube is cut, the resulting carbonaceous tube is a mixture of ones that have transition metal particles in the tube end and those that do not have transition metal particles in the tube end.

The carbon material which forms the carbonaceous nanotube of the present invention, normally, has a content ratio of the hydrogen atom about 0.1~1 weight %. The content ratio of carbon atom is at least 98.5 weight %. The content ratio of the transition metal atom is about 0.005~1 weight %. Preferably, the content weight ratio of the hydrogen atom is 0.15~0.7 weight %, the content ratio of carbon is at least 99 weight %, and the content ratio of the transition metal is 0.01~0.7 weight %. Even more preferably, the content ratio of hydrogen is 0.2~0.5 weight %, the content ratio of carbon is at least 99 weight %, and the content ratio of the transition metal is 0.02~0.5 weight %.

When the hydrogen content ratio of the carbon material forming the carbonaceous nanotube of the present invention is 0.1~1 weight %, a composite material of this carbonaceous nanotube with a resin has improved wettability of the carbonaceous nanotube with respect to the resin. This improvement in wettability is thought to be based on the increased chemical active sites on the surface of the carbonaceous nanotube resulting from the presence of the hydrogen atoms.

The content ratio of hydrogen atoms, the content ratio of carbon atoms, and the content ratio of the transition metal atoms can be measured by known elemental analysis methods.

When the carbonaceous nanotube of the present invention is heat treated by heating to more than 2000° C., preferably 2500~3000° C., it becomes a graphite nanotube.

Manufacturing Method of the Carbonaceous Nanotube

The manufacturing method for the carbonaceous nanotube of the present invention, as long as it has the properties of the carbonaceous nanotube of the present invention, is not limited to any one particular method.

The manufacturing method of the present invention is well-suited for manufacturing a carbonaceous nanotube which contains hydrogen atoms, transition metal atoms, carbon atoms, and which has a hollow part with an inner diameter of, at most, 5 nm and a thickness part of, at most, 10 nm.

In the manufacturing method for the carbonaceous nanotube of the present invention, a raw material mixture is obtained by mixing a transition metal compound containing transition metal atoms, a sulfur compound containing sulfur atoms, an organic compound containing hydrocarbons, and a carrier gas. This raw material mixture is supplied to a reaction region which is maintained at a temperature of 900~1,300° C. inside a reaction tube.

Transition Metal Compound

The transition metal compound in the present invention contains transition metal atoms. By decomposing the transition metal compound inside the reaction tube, it generates transition metal particles as catalysts.

The decomposition temperature of the transition metal compound is normally 50~900° C., preferably 70~800° C., and more preferably 100~700° C.

The above transition metal compound is preferably supplied as a gas to the reaction region which is maintained at a temperature of 900~1300° C. inside the reaction tube. However, even if the above transition metal compound is supplied to a zone, in this same reaction container, slightly upstream from the reaction region and at a slightly lower temperature, for example 400~900° C., essentially the same results are achieved. The above transition metal compounds are ideally ones that are vaporized completely before the temperature is raised to the specified reaction temperature.

As the above transition metal atoms, examples include metals in the periodic table group VIII. Suitable transition metal atoms include iron, nickel, cobalt, and the like. Concrete examples of other transition metal atoms include scandium, titanium, vanadium, chromium, manganese, and the like. Among these, group VIII metals of iron, cobalt, nickel, and the like are preferred.

As the transition metal compounds, examples include organic transition metal compounds and inorganic transition metal compounds.

As the above organic transition metal compounds, examples include ferrocene, nickelocene, cobaltcene, iron carbonyl, iron acetylacetonato, iron oleate, and the like. As the above inorganic transition metal compound, examples include iron chloride and the like. Among these, metallocenes of metals in the periodic table group VIII, particularly ferrocene and nickelocene, are preferred.

Sulfur Compounds

Sulfur compounds in the present invention contain sulfur atoms and interact with the transition metal as a catalyst to accelerate the generation of the carbonaceous nanotube.

Examples of the above sulfur compounds include organic sulfur compounds, inorganic sulfur compounds and the like.

Examples of the above organic sulfur compounds include sulfur-containing heterocyclic compounds, such as thianaphthene, benzothiophene, thiophene, and the like. As the above inorganic sulfur compounds, examples include hydrogen sulfide, and the like.

Organic Compounds

The organic compound of the present invention can be used as the carbon source for the carbon material which forms the carbonaceous nanotube. Preferably, the organic compound contains a hydrocarbon.

Concrete examples of the above organic compound include aromatic hydrocarbons such as benzene, toluene, xylene, naphthalene, anthracene, and the like; aliphatic hydrocarbons, such as methane, ethane, propane, butane, heptane, hexane, ethylene, propylene, acetylene, and the like; mixtures, such as gasoline, gas oil, kerosene, oil fuel, anthracene oil, creosote oil, and the like; oxygen containing organic substances such as alcohol, furan, and the like; nitrogen containing organic substances such as amine, pyridine, and the like. If there are free carbons contained in the above organic compound, it is preferable to remove the free carbons beforehand.

If the above organic compound is a liquid at room temperature, for example at 20° C., this is preferable from the standpoint of ease of handling. Furthermore, if the above organic compound is solid or a viscous liquid at room temperature, this organic compound can be used dissolved in a low viscosity solvent such as toluene, hexane, and the like. When using oxygen containing organic substances or nitrogen containing substances for the above organic compound, these are preferably used together with hydrocarbons.

Carrier Gas

As the carrier gas of the present invention, hydrogen and the like can be used favorably. Other than hydrogen, non-reactive gases which do not affect the generative reaction for the carbonaceous nanotube, reaction accelerating gases which accelerate the generative reaction for the carbonaceous nanotube, and reaction inhibiting gases which inhibit the carbonaceous nanotube generating reaction can be added to the carrier gas.

As the above non-reactive gas, examples include noble gases of helium, neon, argon, and the like, and nitrogen and the like. As the reaction accelerating gas, examples include carbon monoxide, carbon dioxide, methane, and the like. Examples of reaction inhibiting gases include oxygen, air, and the like.

At least one type of gas selected from the group consisting of non-reactive gases and reaction accelerating gases can be added at 50 volume % or less to the carrier gas. Preferably, the gas is added in the range of 5~40 volume %, and more preferably, in the range of 10~30 volume %.

The above reaction inhibiting gas can be added to the carrier gas at 30 volume % or less, preferably 20 volume % or less, and more preferably in the range of 1~10 volume %.

Raw Material Mixture

The raw material mixture of the present invention can be obtained by mixing the above transition metal compound, the above sulfur compound, the above organic compound, and the above carrier gas.

With the above raw material mixture, the above transition metal compound is mixed into the raw material mixture so that the concentration of the transition metal atoms in the raw material mixture is in the range of 0.025~0.5 mol %. The above organic compound is mixed in the raw material mixture so that the concentration of the above hydrocarbon in the raw material mixture is in the range of $(273/(T-1000))^4 \sim 10(273/T-1000))$ mol %, wherein T represents absolute temperature (K) in the reaction region.

In the present invention, by adjusting the concentration of the transition metal atoms in the above material mixture within a range of 0.025~0.5 mol %, a carbonaceous nanotube, in which a hollow part with a specified inner diameter is formed along the axial direction of the carbonaceous fiber, is effectively manufactured.

If the concentration of the above transition metal atom exceeds 0.5 mol %, the yield of the resulting carbonaceous nanotube is decreased. If the concentration of the above transition metal atom is less than 0.025 mol %, the carbonaceous nanotube is not generated.

The inner diameter of the hollow part formed in this carbonaceous nanotube, or stated another way, the inner perimeter diameter of the carbonaceous nanotube, is related to the particle diameter of the transition metal particles generated in the reaction tube by the decomposition of the above transition metal compound. It is thought that the larger the particle diameter of the transition metal particles, the larger the inner diameter of the hollow part. In other words, the larger the inner perimeter diameter of the carbonaceous nanotube.

Judging from the results of observing the transition metal particles contained at the ends of the generated carbonaceous nanotubes, when the particle diameter of the above transition metal particles generated inside the reaction tube has a particle diameter of 1.5~6 nm, and preferably 2~5 nm, carbonaceous nanotubes having an average outer perimeter diameter of 3~12 nm and an average inner perimeter diameter of 2~5 nm are manufactured effectively. Therefore, by appropriately selecting the above transition metal atom concentration and the following hydrocarbon concentration and temperature, transition metal having a suitable particle diameter is generated. As a result, the carbonaceous tube of the present invention can be obtained.

With the present invention, the above organic compound can be mixed in the above raw material mixture so that the concentration of the above hydrocarbon in the above raw material mixture is in the range of $(273/(T-1000))^4 \sim 10(273/T)-1000))$ mol %, wherein T represents the absolute temperature (K) of the reaction region.

The concentration of the above hydrocarbon in the raw material mixture can be decided, for example, by the relationship with the carbon ratio with respect to the above transition metal atoms, the organic material concentration in the above raw material mixture, and the temperature of the reaction region.

Furthermore, the concentration of the above hydrocarbon in the raw material mixture can be decided while taking into consideration the decomposition temperature, reaction temperature, and the like, for each type of hydrocarbon that is used.

Particularly when the reaction temperature is in the range of 1,000~1,200° C., it is preferable to mix the above organic compound in the above raw material mixture so that the concentration of the above hydrocarbon in the raw material mixture is in the range of $(273/(T-1000))^3 \sim 10(273/(T-1000))^2$ mol %, wherein T represents the absolute temperature (K) of the reaction region.

If the concentration of the above hydrocarbon in the above raw material mixture exceeds $10(273/(T-1000))$ mol %, the distance between the inner perimeter surface to the outer perimeter surface of the carbonaceous nanotube, or stated differently, the thickness of the thickness part of the carbonaceous nanotube, can become unnecessarily thick, or the hydrogen content ratio in the carbon material which forms the carbonaceous nanotube can exceed 1%. If the hydrogen atom content ratio in the above carbon material exceeds 1%, there can be problems such as reduced electroconductivity in the carbonaceous nanotube.

If the concentration of the above hydrocarbon in the above raw material mixture is less than $(273/(T-1000))^4$ mol %, the generation of the carbonaceous nanotube can stop, or the productivity can be reduced.

In the present invention, the concentration of sulfur atoms in the above raw material mixture is preferably in the range of ¼~5 times, particularly ½~3 times the concentration of the above transition metal atom. The above sulfur compound is mixed in the above raw material mixture so that the concentration of the above sulfur atoms in the above raw material mixture is in the range of 0.00625~2.5 mol %, and preferably in the range of 0.0125~1.5 mol %.

If the concentration of the sulfur atoms in the above raw material mixture is in the range of 0.00625~2.5 mol %, the above transition metal particle can decompose the above organic compound and can maintain its activity as the nucleus for deposition in one direction of carbon. A tube-shaped carbonaceous nanotube, which has few twists and turns, can be manufactured efficiently and easily. Twists and turns are the result of abnormality of crystal growth. When there are few twists and turns, the true properties (mechanical properties, electrical properties, thermal properties, and the like) of the carbonaceous nanotube can be achieved. Furthermore, carbonaceous nanotubes with few twists and turns can be easily dispersed in resins and rubbers and can be dispersed in an arrangement with directionality.

If the above sulfur atom density exceeds 2.5 mol %, there is difficulty in generating the carbonaceous nanotube. When the concentration of the above sulfur atoms is less than 0.00625 mol %, a large amount of bent carbonaceous nanotubes is generated, and there is difficulty in generating the carbonaceous nanotube.

When supplying the above raw material mixture to the reaction region inside the above reaction tube, the above raw material mixture can be supplied more stably if, for example, it is dissolved in a hydrocarbon or other organic solvent or in a small amount of inorganic solvent and the like.

The time that the above raw material mixture spends in the reaction region, based upon the length of reaction region/flow speed of the raw material mixture at the reaction temperature, is normally within one minute, and preferably in the range of 0.1~30 seconds, and most preferably in the range of 1~20 seconds.

Fiber Aggregate

According to the method for manufacturing the carbonaceous nanotube of the present invention, the following fiber aggregate is achieved. This fiber aggregate contains the above described carbonaceous nanotube of the present invention at a ratio of about 70 weight % with respect to the whole. The fiber aggregate also contains 0.1~1 weight % of hydrogen atoms with respect to the whole, carbon atoms at a content ratio of at least 98.5 weight % with respect to the whole, and transition metal atoms at a content ratio of 0.005~1 weight % with respect to the whole.

The above fiber aggregates can also contain by-products and the like, such as soot, tar materials, and non-hollow carbonaceous fibers, which do not have hollow parts, and the like.

The above tar material in the above fiber aggregate can be removed by rinsing with organic solvents such as toluene, acetone and the like, for example. The above tar material can also be removed by evaporating in an inert atmosphere of approximately 1,000° C. and decomposing this evaporated tar material. The above fiber aggregate normally contains at least 70 weight % of the above thin carbonaceous nanotube, and preferably contains at least 80 weight %.

By having the above fiber aggregate contain at least 70 weight % of the above thin carbonaceous nanotube, in a composite material of the above fiber aggregate and resin, for example, the mechanical properties of strength, elasticity, and the like, electrical properties, and thermal properties of this composite material is effectively improved.

Furthermore, the above fiber aggregate may also contain carbon-covered metal particles, which are transition metal particles of a diameter of several nm, for example 1–10 nm, covered by carbon material. The above carbon-covered metal particles can be removed from the above fiber aggregate by acid rinsing and the like, but by having a content in the above fiber aggregate in a range not exceeding 1 weight %, in the composite material of the above fiber aggregate and a resin, for example, the wettability of the fiber aggregate with respect to the resin is effectively improved, and the mechanical properties of strength and elasticity and the like of this composite material is effectively improved.

EXAMPLE

Embodiment 1

Referring to FIG. 1, the manufacture of the carbonaceous nanotube was conducted using a vertical-type vapor grown carbon fiber manufacturing device 1.

Vapor grown carbon fiber manufacturing device 1 has a raw material tank 2, a raw material pump 3, a raw material vaporizer 4, a pre-heater 5, a first carrier gas flow meter 6, a second carrier gas flow meter 7, a third carrier gas flow meter 8, a raw material mixture gas supply nozzle 9, a reaction tube 10, a flow straightener 11, a second carrier gas supply nozzle 12, a third carrier gas supply nozzle 13, an electric furnace 14, a fiber collector 15, and a gas exhaust opening 16.

The inner diameter of reaction tube 10 is 8.5 cm.

The reaction region is from the lower end of flow straightener 11 to a position at approximately 80 cm towards fiber collector 15. The temperature inside reaction tube 10 is controlled so that the reaction region is maintained at 1100° C. Downstream from the above reaction region, the temperature becomes gradually lower. The temperature at fiber collector 15 is around 100~300° C.

A raw material solution of ferrocene:thiophene:toluene with a mixing ratio of a mole ratio of 0.5:0.2:99.3 was stored in raw material tank 2.

The raw material solution was supplied by raw material pump 3 to raw material vaporizer 4 via a raw material supply pipe 17. After vaporizing the raw material solution and making into a raw material gas, this raw material gas and a first carrier gas are mixed so that the concentration of the raw material gas is at 4 volume %.

The above first carrier gas had a mixing ratio of hydrogen:nitrogen of a volume ratio of 80:20 and was supplied to the inside of raw material gas pipe 19 through first carrier gas supply pipe 18 and was mixed with the raw material gas.

The raw material mixture gas, which was obtained by mixing the above raw material gas and the above first carrier gas so that the raw material gas was 4 volume %, was pre-heated by pre-heater 5. Next, the raw material mixture gas was supplied to raw material mixture gas supply nozzle 9 via raw material mixture gas supply pipe 20. This raw material mixture gas corresponds to the raw material mixture of the present invention.

The inner diameter of the above raw material mixture gas supply nozzle 9 was 2 cm. The temperature inside raw material mixture gas supply nozzle 9 was controlled at approximately 400° C.

Because, at room temperature, the above raw material mixture gas was supplied at 2 L/minute, the raw material mixture gas was blown in from raw material mixture gas supply nozzle 9 at 400° C. at a speed of 24 cm/second.

The second carrier gas was pure hydrogen, supplied to flow straightener 11 from second carrier gas supply nozzle 12 via second carrier gas supply pipe 21.

Because, at room temperature, the above second carrier gas was supplied at 7 L/minute, it must have flowed through the space between the inner perimeter wall surface (inner diameter 7 cm) of flow straightener cylinder 11a provided on flow straightener 11 and the outer perimeter wall (outer diameter 4 cm) of raw material mixture gas supply nozzle 9 at approximately 1100° C. at a speed of 21 cm/second.

The third carrier gas was a mixture of nitrogen:air at a mixing ratio of 80:20 volume ratio. Third carrier gas was supplied to flow straightener 11 from third carrier gas supply nozzle 13 via third carrier gas supply pipe 22.

Because, at room temperature, the above third carrier gas was supplied at 3 L/minute, it must have flowed through the space between the outer perimeter wall surface (outer diameter 7.5 cm) of flow straightener cylinder 11a provided on flow straightener 11 and the inner perimeter wall (inner diameter 8.5 cm) of reaction tube 10 at approximately 1100° C. at a speed of 19 cm/second.

With this reaction device, convection flow did not occur, and there was an air flow approximating a piston flow with a direction of gas flow from vertically above to vertically downward.

By bringing in the surrounding pure hydrogen gas, the raw material mixture gas, flowing down from raw material mixture gas supply nozzle 9, flowed down while the raw material gas in the raw material mixture gas was being dispersed in the hydrogen.

The above raw material mixture gas and pure hydrogen gas contacted the third carrier gas, which flowed down along the inner perimeter wall of reaction tube 10. By having the above third carrier gas interposed between the above raw material mixture gas and pure hydrogen gas and the inner perimeter wall surface of reaction tube 10, the adhesion of products on the inner perimeter wall surface of reaction tube 10 are prevented.

The raw material concentration in the reaction region immediately after blowing out of the nozzle was 4%, but as it flowed down the reaction tube, it was gradually diluted by mixing with the second carrier gas. However, because the flow approximated a piston flow, it can be hypothesized that it was not completely mixed. Although it was gradually mixed with the third carrier gas as well, it can be hypothesized that there would be a large amount of nitrogen/air components near the reaction tube wall, and there would be a large amount of raw material components/hydrogen in the reaction tube interior.

After maintaining this state for 30 minutes, raw material supply pump 3 was stopped and left standing for 5 minutes. Afterwards, the inside of reaction tube 10 was substituted with nitrogen gas.

From the filter part of gas exhaust opening 16, 0.5 g of fiber, and from fiber collector 15, 2.2 g of fiber was collected.

The fibers collected from the above filter part and the fibers collected from fiber collector 15 were each observed with a high resolution transmission electron microscope.

When the fibers collected from the above filter part were observed, there was a mixture of fibers of outer perimeter diameter of 5~8 nm. They were hollow carbon fibers with an average outer perimeter diameter of 6 nm and an average inner perimeter diameter of 4 nm. These hollow carbon fibers were labeled as Sample 1.

When the fibers collected from fiber collector 15 were observed, there was a mixture of fibers of outer perimeter diameter 8~30 nm. They were hollow carbon fibers with an average outer perimeter diameter of 23 nm, and an average inner perimeter diameter of 4 nm. These hollow carbon fibers were labeled as Sample 2.

Embodiment 2

The reaction region was maintained at 1150° C., a solution of ferrocene:thiophene:toluene with a mixing ratio of a mole ratio of 1.5:0.8:97.7 was used as the raw material solution. Pure hydrogen gas was used for each of the first carrier gas and second carrier gas. Pure nitrogen gas was used as the third carrier gas. The above raw material solution was vaporized and made into the raw material gas. Next, the raw material gas and the first carrier gas were mixed so that the raw material gas was 2 volume %, and a raw material mixture gas was obtained. There was downward flow of this raw material mixture gas at a speed of 30 cm/second, and there was downward flow of the second carrier gas at 12 cm/second, and there was downward flow of the third carrier gas at 12 cm/second. In order to manufacture a carbon fiber, all else was the conducted the same as Embodiment 1.

From fiber collector 15, 1.5 g of fiber, and from the filter part of gas exhaust opening 16, 1.0 g of fiber was collected.

The fibers collected from the above filter part and the fibers collected from fiber collector 15 were observed with a high resolution transmission electron microscope.

When the fibers collected from the above filter part were observed, there was a mixture of fibers of outer perimeter diameter 5~9 nm. They were hollow carbon fibers with an average outer perimeter diameter of 7 nm and an average inner perimeter diameter of 3.5 nm. These hollow carbon fibers were labeled as Sample 3.

When the fibers collected from fiber collector 15 were observed, there was a mixture of fibers with an outer perimeter diameter of 7~25 nm. They were hollow carbon fibers with an average outer perimeter diameter of 20 nm and an average inner perimeter diameter of 4 nm. These hollow carbon fibers were labeled as Sample 4.

Comparative Example 1

Vapor grown carbon fibers, which have been graphitized and which have an average outer perimeter diameter of 200 nm and an average inner perimeter diameter of 3 nm, were prepared. These vapor grown carbon fibers which have been graphitized were labeled as Sample 5.

Evaluation

Referring to Table 1, spacing of basal graphite plane ($d_{002}$), hydrogen atom content ratio, carbon atom content ratio, transition metal atom content ratio, specific surface area, water retention rate, hydrogen absorption amount, and flexural strength, flexural modulus, and specific resistance of the composite material when mixed with epoxy resin are shown for the above Samples 1~5.

In the above composite material, each sample was mixed at 10 volume %.

Samples 1 and 4 obtained in the above Embodiments 1 and 2 correspond to the carbonaceous nanotube of the present invention.

TABLE 1

| | Sample 1 | Sample 2 | Sample 3 | Sample 4 | Sample 5 |
|---|---|---|---|---|---|
| Average fiber diameter (nm) | 6 | 23 | 7 | 20 | 200 |
| Average hollow diameter (nm) | 4 | 4 | 3.5 | 4 | 3 |
| Average thickness (nm) | 1 | 9.5 | 1.8 | 8 | 98 |
| basal graphite plane spacing $d_{002}$ (nm) | 0.347 | 0.349 | 0.345 | 0.348 | 0.336 |
| Elemental analysis: | | | | | |
| Hydrogen (wt %) | 0.3 | 0.5 | 0.2 | 0.6 | 0 |
| Carbon (wt %) | 99.6 | 99.4 | 99.7 | 99.8 | 99.9 |
| Transition metal (wt %) | 0.2 | 0.1 | 0.2 | 0.1 | 0 |
| Specific surface area $m^2/g$ | 100 | 250 | 900 | 200 | 5 |
| Water retention rate | Large | Medium | Large | Medium | Very small |
| Hydrogen absorption amount | Very large | Medium | Large | Medium | Very small |
| Properties of epoxy resin composite material (fiber 10 vol %) | | | | | |
| flexural strength ($kg/mm^2$) | 9 | 7 | 9 | 6 | 4 |
| flexural modulus ($kg/mm^2$) | 360 | 320 | 390 | 340 | 510 |
| Specific resistance (ohm/cm) | 0.1 | 1 | 0.1 | 1 | 15 |

According to the carbonaceous nanotube of the present invention, for example, with the composite material obtained by combining the carbonaceous nanotube with resin, the carbonaceous nanotube has excellent wettability. As a result, the mechanical strength of the above composite material is effectively improved.

According to the present invention, the carbonaceous nanotube and the fiber aggregate, which contains a ratio of at least 70 weight % with respect to the whole of the carbonaceous nanotube, have excellent conductivity. In addition, there are active sites on their surfaces. As a result, the problems of wetting and the like with composite materials of the prior art are solved. For example, a high performance composite material which has excellent electrical properties such as specific resistance and the like, and excellent mechanical properties, such as bending strength, bending elasticity, and the like, and excellent chemical properties, such as water retention ability and absorptive ability, and the like is obtained.

According to the manufacturing method for the carbonaceous nanotube of the present invention, the above carbonaceous nanotube and the above fiber aggregates are obtained easily.

The carbonaceous nanotube and fiber aggregate of the present invention have a large specific surface area, many active sites, and excellent chemical resistance. As a result, for example, they are effectively used in adsorbents and hold-back agents.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A carbonaceous hollow nanotube comprising:
   a carbon material and having an inner diameter less than or equal to 5 nm; and an outer diameter wherein the difference between said outer diameter and said inner diameter is equal to or less than 20 nm;
   said carbon material comprising hydrogen atoms, carbon atoms and at least one transition metal atom; wherein said nanotube is annular and tube-shaped; and
   wherein said nanotube comprises a plurality of disordered, annular, tube-shaped layers and the disordering is caused by hydrogen atoms.

2. The carbonaceous nanotube according to claim 1 wherein the difference between said outer diameter and said inner diameter is equal to or less than 10 nm.

3. The carbonaceous nanotube according to claim 1 wherein said transition metal is iron.

4. A fiber aggregate comprising: carbonaceous hollow nanotubes comprising a carbon material and having an inner diameter of less than or equal to 5 nm; and an outer diameter wherein the difference between said outer diameter and said inner diameter is equal to or less than 20 nm;
   said carbon material comprising hydrogen atoms, carbon atoms, and at least one transition metal atom;
   said carbonaceous nanotubes comprising at least 70 weight % of said fiber aggregate;
   said hydrogen atoms comprising 0.1 to 1 weight % of said fiber aggregate; and
   said carbon atoms comprising at least 98.5 weight % of said fiber aggregate; wherein said nanotubes are annular and tube shaped;
   wherein said nanotubes comprise a plurality of disordered, annular, tube-shaped layers and the disordering is caused by hydrogen atoms.

5. The fiber aggregate according to claim 4 further wherein the difference between said outer diameter and said inner diameter is equal to or less than 10 nm.

6. The fiber aggregate according to claim 4 wherein said transition metal is iron.

7. The fiber aggregate according to claim 4 wherein said transition metal comprises 0.005 to 1 weight % of said aggregate.

* * * * *